(12) United States Patent
Tanguy et al.

(10) Patent No.: US 9,618,276 B2
(45) Date of Patent: Apr. 11, 2017

(54) METHODS FOR STORING AND RELEASING THERMAL ENERGY, ASSOCIATED REACTOR AND APPLICATION TO THE INTERSEASONAL STORAGE OF SOLAR HEAT

(71) Applicant: COMMISSARIAT A L'ENERGIE ATOMIQUE ET AUX ENERGIES ALTERNATIVES, Paris (FR)

(72) Inventors: Gwennyn Tanguy, Voglans (FR); Foivos-Epameinon Marias, Chambery (FR); Joël Wyttenbach, Curienne (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 217 days.

(21) Appl. No.: 14/426,079

(22) PCT Filed: Aug. 28, 2013

(86) PCT No.: PCT/IB2013/058074
§ 371 (c)(1),
(2) Date: Mar. 4, 2015

(87) PCT Pub. No.: WO2014/037853
PCT Pub. Date: Mar. 13, 2014

(65) Prior Publication Data
US 2015/0219402 A1 Aug. 6, 2015

(30) Foreign Application Priority Data
Sep. 4, 2012 (FR) .................................... 12 58219

(51) Int. Cl.
*F24D 15/02* (2006.01)
*F28D 20/00* (2006.01)
*F24D 11/00* (2006.01)

(52) U.S. Cl.
CPC ............ *F28D 20/003* (2013.01); *F24D 11/00* (2013.01); *F28D 20/0043* (2013.01);
(Continued)

(58) Field of Classification Search
CPC ........ F24D 11/00; F24D 15/02; F28D 20/003; F28D 20/00
(Continued)

(56) References Cited
U.S. PATENT DOCUMENTS 4,227,567 A * 10/1980 Greene ................. F28D 20/025
126/400
4,285,389 A * 8/1981 Horton .................... F28D 11/04
126/639
(Continued)

FOREIGN PATENT DOCUMENTS
WO 2008/094094 A1 8/2008

OTHER PUBLICATIONS

Mauran et al., "Solar heating and cooling by a thermochemical process. First experiments of a prototype storing 60 kWh by a solid/gas reaction", Solar Energy, (2008), vol. 82, Issue 7, pp. 623-636.
(Continued)

*Primary Examiner* — Gregory Huson
*Assistant Examiner* — Nikhil Mashruwala
(74) *Attorney, Agent, or Firm* — Oliff PLC

(57) ABSTRACT

The invention concerns a method for storing or releasing thermal energy by chemical reaction according to which a flow of heat-transfer gas is circulated through a layer (10) of a first hygroscopic salt A, then through a layer (20) of a second hygroscopic gas B, the gas being reactive with salts A and B, the thermodynamic equilibrium curve of salt A being located further to the left than that of second salt B in a pressure-temperature phase diagram, the circulation of the
(Continued)

flow of gas causing a dehydration or hydration reaction of both first salt A and second salt B.

5 Claims, 3 Drawing Sheets

(52) U.S. Cl.
    CPC ..... *F28D 2020/0082* (2013.01); *Y02E 60/142* (2013.01); *Y02E 70/30* (2013.01)

(58) Field of Classification Search
    USPC ........ 126/619, 434, 436; 252/67, 69, 70, 71; 165/1, 85
    See application file for complete search history.

(56) References Cited

U.S. PATENT DOCUMENTS

| | | | |
|---|---|---|---|
| 4,303,121 A | 12/1981 | Pangborn | |
| 5,237,827 A | 8/1993 | Tchernev | |
| 5,685,289 A * | 11/1997 | Yogev | F24J 2/34 126/400 |
| 7,588,694 B1 * | 9/2009 | Bradshaw | C01B 21/48 252/67 |
| 9,433,910 B2 * | 9/2016 | Wyttenbach | B01J 8/0207 |
| 2010/0038581 A1 * | 2/2010 | Gladen | C01D 9/00 252/67 |
| 2013/0180519 A1 * | 7/2013 | Groppel | C01D 3/02 126/679 |

OTHER PUBLICATIONS

Mireille Harmelin et al., "Evaluation par analyse thermique différentielle des chaleurs de déshydratation de plusieurs aluns de chrome, aluminium et fer," Journal of Thermal Analysis, (1969), vol. 1, pp. 137-150.

Nov. 26, 2013 International Search Report issued in Application No. PCT/IB2013/058074.

Aug. 28, 2013 Written Opinion issued in International Patent Application No. PCT/IB2013/058074.

* cited by examiner

METHODS FOR STORING AND RELEASING THERMAL ENERGY, ASSOCIATED REACTOR AND APPLICATION TO THE INTERSEASONAL STORAGE OF SOLAR HEAT

TECHNICAL FIELD

The present invention relates to a process for storing thermal energy and a process for releasing thermal energy by chemical reaction and an associated reactor.

The main application targeted is the interseasonal storage of solar heat for buildings, such as residential, industrial or tertiary buildings.

PRIOR ART

Systems for storing thermal energy in buildings could make it possible to completely or partly meet the heating and cooling requirements using energy absorbed at a completely different time. These storage systems may be designed for charging and discharging energy over three types of durations: daily, weekly and seasonal. Interseasonal thermal energy storage enables a building to use heat collected during the summer for the heating thereof during the winter.

Some processes and devices have already been developed for interseasonal solar heat storage.

Thermal energy storage processes may be classified according to the storage mechanism thereof into various categories: sensible heat storage, latent heat storage, storage by sorption and storage by chemical reaction.

In thermal energy storage by sensible heat, the thermal energy is stored by the change in the temperature of the storage material. Thus, the storage capacity depends on the temperature difference, on the specific heat and on the amount of storage material. Sensible heat storage may be carried out using a liquid material, such as water, or solid material, such as rocks.

In latent heat storage, the principle is that when heat is provided to a material, this material changes phase and passes from the solid state to the liquid state for the storage of heat in the form of latent heat of fusion or from liquid to vapor in the form of latent heat of vaporization. When the stored heat is extracted, the material again undergoes a change of its phase from liquid to solid or from vapor to liquid.

In sorption thermal storage, the principle is that the heat provided to a sorption pair XY enables the desorption to two constituents X and Y which may be stored separately (endothermic reaction). Conversely, the sorption (absorption and/or adsorption) of one of the constituents X by the other Y makes it possible to form the compound XY with the release of heat (exothermic reaction). The thermal energy may therefore be stored with negligible heat losses since the heat is not kept in a sensible or latent form, but as a chemical potential. Thus, the energy is stored without heat loss and may be released when this is necessary. As a sorption pair that has already been studied, mention may be made of a solid-gas pair which is zeolite/$H_2O$ (water vapor). For physical sorption (or physisorption) reactions, the thermodynamic equilibrium depends on the temperature, on the relative pressure of the gaseous reactant and on the degree of progress of the reaction.

Finally, in thermal storage by chemical reaction, the principle is to use a reversible chemical reaction with supply of heat in one direction and release of heat in the other direction. Just like sorption thermal storage, thermal storage by chemical reaction has the major advantage of an indefinitely long storage time at ambient temperature. In addition, thermal storage by chemical reaction makes it possible to obtain storage densities that are generally higher. In the case of thermochemical reactions, also referred to as chemisorption, the thermodynamic equilibrium depends on the temperature and on the relative pressure of the gaseous reactant. It is independent of the degree of progress of the reaction.

One of the reversible chemical reactions already known for the storage and release of thermal energy is the hydration/dehydration reaction of a hygroscopic salt. A hygroscopic salt has an equilibrium curve which is specific thereto and which delimits the conditions of temperature and humidity of the air in which it undergoes a hydration or conversely a dehydration.

Thus, an appropriate hygroscopic salt has already been brought into contact with hot air during the summer in order to give rise to a chemical dehydration reaction, this endothermic reaction makes it possible to store heat. In winter, the chemical reaction is reversed by rehydrating the hygroscopic salt: the reaction is then exothermic, which produces heat that may be used to heat a building.

The conflicting thermodynamic constraints between a hydration reaction and a dehydration reaction in fact greatly reduce the choice of the hygroscopic salt.

Mention may be made here of the hygroscopic salts that the experimental studies of the inventors and other experimental studies have shown to be suitable for interseasonal storage of solar heat for residential buildings. Besides the fact that they may undergo hydration/dehydration reactions compatible with the thermodynamic constraints, as indicated above, they are compact and may thus be stored in a volume compatible with that of a building. They may in particular be either strontium bromide ($SrBr_2$), as described in publication [1], or the salt commonly referred to as potash alum (double sulfate of aluminum and potassium) ($KAl(SO_4)_2$), as described in publication [2].

However, on examining the same studies, it has been observed that the most efficient salts from a thermodynamic viewpoint, that is to say those which intrinsically are capable of producing the greatest heat in winter, are also the most expensive. Typically, highly efficient strontium bromide may be made from strontium and bromine, which are certainly not rare as they are available in a large amount, but are diluted in seawater and in brines.

There is therefore a need to improve the storage and release of thermal energy by chemical reaction, in particular with a view to decreasing the investment cost of the hygroscopic salts used.

One particular requirement is to guarantee a storage volume of said salts that is compatible with that of a dwelling.

SUMMARY OF THE INVENTION

In order to do this, a subject of the invention is, according to one of its aspects, a process for storing thermal energy by chemical reaction wherein a flow of heat transfer gas is circulated through a layer of a first hygroscopic salt A then through a layer of a second hygroscopic salt B, the gas being reactive with the salts A and B, the thermodynamic equilibrium curve of the salt A being located further to the left than that of the second salt B in a pressure-temperature phase diagram, the circulation of the flow of gas giving rise to a dehydration reaction both of the first salt A and of the second salt B.

According to another of its aspects, another subject of the invention is a process for releasing thermal energy by chemical reaction wherein a flow of heat transfer gas is circulated through a layer of a first hygroscopic salt A then through a layer of a second hygroscopic salt B, the gas being reactive with the salts A and B, the thermodynamic equilibrium curve of the salt A being located further to the left than that of the second salt B in a pressure-temperature phase diagram, the circulation of the flow of gas giving rise to a hydration reaction both of the first salt A and of the second salt B.

The expression "equilibrium curve" is understood to mean the standard definition, that is to say the curve that defines the thermodynamic equilibrium of the hygroscopic salt in question (A or B) under given temperature and pressure conditions. Temperature conditions higher than or relative pressure conditions lower than the equilibrium conditions are favorable to the dehydration. Temperature conditions lower than or relative pressure conditions higher than the equilibrium conditions are favorable to the hydration.

The expression "located further to the left" is understood to mean a relative position of the equilibrium curve of the salt A that is closer to the pressure axis than that of the salt B. In other words, for an identical partial pressure of water, the equilibrium temperature of the salt A is lower than that of the salt B. In yet other words, for an identical water content, the equilibrium temperature of the salt B is higher than that of the salt A.

It is recalled that the thermodynamic equilibrium curve is defined by the following equation: $Ln\ (P/P\ ref) = -\Delta Hr/RT + \Delta Sr/R$;

in which $\Delta Hr$ and $\Delta Sr$ are constants specific to each salt, P denotes the relative pressure of the gaseous reactant, P ref denotes the reference pressure, T denotes the temperature and R is the ideal gas constant.

The flow of gas according to the invention may solely consist of one gas, advantageously moist air, but more generally may consist of any gas mixture with one gas having the role of heat transfer fluid and another gas having the role of reactant for the salts A and B.

The flow of gas is advantageously a flow of moist air. It is specified here that moist air is the standard scientific name given to air carrying water vapor. Thus, for thermal storage, the moist air that is circulated over the salts A and B is relatively drier and hotter while for the release of thermal energy, the moist air is relatively cooler and wetter.

Thus, the inventors have thought of a simple solution which consists in combining the effect of at least one hygroscopic salt of lower thermodynamic performance and lower cost with a hygroscopic salt with better thermodynamic performance but higher cost. The solution according to the invention is in no way suggested in the prior art since in the field of chemical thermal storage, several hygroscopic salts have been studied, but each time individually with no encouragement to use two hygroscopic salts in series. Owing to the invention, it is possible to reduce the investment cost of the hygroscopic salts by reducing the amount of the most expensive salt needed. The solution according to the invention additionally makes it possible to use a compact volume of hygroscopic salts that is compatible with the volume of a dwelling.

In other words, the invention consists, for the release of thermal energy, which corresponds to restoring heat in winter, in circulating relatively cool and moist air by beginning with the layer of the hygroscopic salt having the lowest equilibrium temperature in order to finish with the layer of the salt having the highest equilibrium temperature. Thus, the gas temperature at the outlet may be close to that obtained with the salt having the highest equilibrium temperature. By way of example, the moist air may firstly pass through a layer of potash alum, which makes it possible to preheat it in a way and to dry it, then it may pass through a layer of strontium bromide which brings it to the desired temperature level.

For the storage of thermal energy, the invention consists in circulating the gas under temperature and moisture conditions such that it enables the dehydration of at least one of the salts.

Several configurations are possible.

Preferably, the dehydration using a flow of moist air takes place with the following two conditions:
 the temperature and moisture conditions of the moist air are such that they enable the dehydration of the salt having the highest equilibrium temperature;
 the circulation of the flow of moist air that gives rise to the dehydration reaction takes place, through the salts, in the opposite direction to that which gives rise to the hydration reaction.

Thus, the air begins by dehydrating the salt having the highest equilibrium temperature, it is moistened and cooled but it is still hot enough and dry enough to dehydrate the other salt.

According to another configuration, if the circulation of the flow of moist air that gives rise to the dehydration reaction takes place, through the salts, in the same direction as that which gives rise to the hydration reaction, then the moist air firstly dehydrates the salt having the lowest equilibrium temperature and the air then risks no longer being hot enough to dehydrate the second salt. In this case, the two salts will not be dehydrated simultaneously but successively.

According to yet another configuration, irrespective of the flow direction of the moist air, it is also possible to envisage deliberately dehydrating one salt after the other. In the case where the air has a sufficient temperature to dehydrate the salt having the lower equilibrium temperature, typically during springtime or at the start of the day, it can be envisaged to dehydrate this salt. The other salt is then dehydrated subsequently and its dehydration then absorbs a lower energy than that needed for dehydrating the whole assembly.

Advantageously, the first salt A is selected from the salts cited in the left-hand column of the table below, while the second salt B is selected respectively from the salts cited in the right-hand column of the table below.

Thus, pairs of salts A/B that may advantageously be used within the context of the invention may be as mentioned in the table:

|  | Salt A | Salt B |
|---|---|---|
| Pair no. 1 | $KAl(SO_4)_2 \cdot (3/12)H_2O$ | $SrBr_2 \cdot (1/6)H_2O$ |
| Pair no. 2 | $Sr(OH)_2 \cdot (1/8)H_2O$ | $SrBr_2 \cdot (1/6)H_2O$ |
| Pair no. 3 | $Sr(OH)_2 \cdot (1/8)H_2O$ | $Na_2S \cdot (2/5)H_2O$ |
| Pair no. 4 | $Na_2S \cdot (2/5)H_2O$ | $Na_2S \cdot (0/2)H_2O$ |
| Pair no. 5 | $NH_4Al(SO_4)_2 \cdot (4/12)H_2O$ | $NiSO_4 \cdot (5/0)H_2O$ |
| Pair no. 6 | $NH_4Al(SO_4)_2 \cdot (4/12)H_2O$ | $SrBr_2 \cdot (1/6)H_2O$ |

It is specified here that the numbers given between parentheses in the table, such as (3/12), (1/6), (0/2), etc. indicate the moles of $H_2O$ contained in the salt in its dehydrated then hydrated form. For example, the hydrated form of strontium bromide is $SrBr_2.6H_2O$ whereas its dehydrated form is $SrBr_2.1H_2O$.

The invention also relates, under another of its aspects, to a fixed bed reactor for storing and releasing thermal energy comprising at least one stage deposited on which is a stack of a layer of a first hygroscopic salt A on a layer of a second hygroscopic salt B, the equilibrium curve of the first salt being different from the second salt.

Advantageously, the reactor may additionally comprise an open-mesh structure separating the layer of the first salt from the layer of the second salt, the structure not being held mechanically in the reactor. Thus, the vertical movement of the structure may allow the swelling and deswelling of each of the two salts during the respectively hydration and dehydration reaction thereof, independently of one another without mixing of the two salts.

The mesh openings of the structure are preferably between 0.05 and 0.1 mm. With such a range of mesh openings, the moist gas may easily circulate through the salts and any mixing between the two salts is avoided.

The open-mesh structure may be metallic but may also be made of a composite material, made of textile material or made of polymer material. It may be a woven (fabric), perforated or sintered structure.

The total height of the layer of the first salt and of the layer of the second salt may be between 5 and 10 cm. The storage volume needed for the salts is advantageously between 5 and 10 m$^3$, which is to say a compact volume perfectly compatible with the volume of a dwelling.

The invention also relates, according to another of its aspects, to a set of two reactors connected in series to one another, one of the reactors comprising at least one stage deposited on which is a layer of a first hygroscopic salt A, the other of the reactors comprising at least one stage deposited on which is a layer of a second hygroscopic salt B, the equilibrium curve of the first salt being different from the second salt. Thus, according to this embodiment, instead of a single fixed bed reactor comprising within it the two salts according to the invention, it is possible to use two reactors of fixed bed type or of circulating fluidized bed type, each of these two reactors comprising within it only one of the two salts. This embodiment may be advantageous, since it may make it possible to use only a single reactor, that is to say the one comprising the salt that has the lowest equilibrium temperature, when, for example, the power and/or temperature for heating a dwelling that is (are) required is lower.

The invention finally relates to the application of the processes, of the fixed bed reactor or of the set of two reactors in series which have just been described, to the interseasonal storage of solar heat.

DETAILED DESCRIPTION

Other advantages and features of the invention will emerge more clearly on reading the detailed description of the invention given by way of illustration and non-limitingly with reference to the following figures, among which:

FIG. 1 is a schematic cross-sectional view of a stack of two layers of different salts according to one example of the invention;

FIG. 2 schematically illustrates the pressure-temperature equilibrium or moisture content-temperature equilibrium diagrams of the system of moist air and two different salts according to one example of the invention;

The equilibrium curve of the first salt A is located to the left of that of the second salt B in a pressure-temperature phase diagram. In other words, for an identical partial pressure of water, the equilibrium temperature of the salt A is lower than that of the salt B. In yet other words, for an identical water content, the equilibrium temperature of the salt B is higher than that of the salt A.

The salt A may advantageously be an inexpensive salt such as potash alum while the salt B may be a more expensive salt such as strontium bromide.

The stack of the two layers 10, 20 of the two different salts A, B may be produced in a fixed bed reactor as described in detail below.

According to the invention, in wintertime, a flow of moist air is circulated which will hydrate the first salt A, then the second salt B. Use is preferably made of the moisture naturally contained in the air but the flow of moist air may also be generated by evaporation of water from a reservoir provided for this purpose.

The reaction between the water vapor contained in the moist air and the first salt A produces heat. Next, the moist air, partly dehydrated and heated by its passage through the layer 10 of the first salt A, passes through the layer 20 of the second salt B. The reaction between the water vapor contained in the moist air and the second salt B again produces heat.

Figure 1:
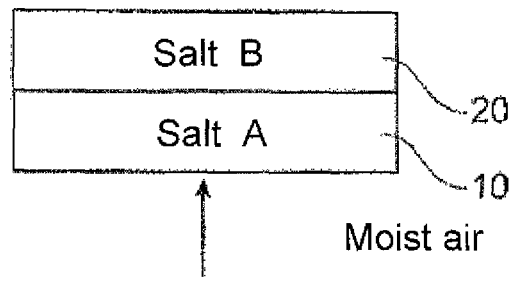
FIG. 1 illustrates the implementation of the process for storing or releasing thermal energy by chemical reaction according to the invention. A layer 10 of a first hygroscopic salt A is surmounted by a second layer 20 of the second hygroscopic salt B.
Figure 2:
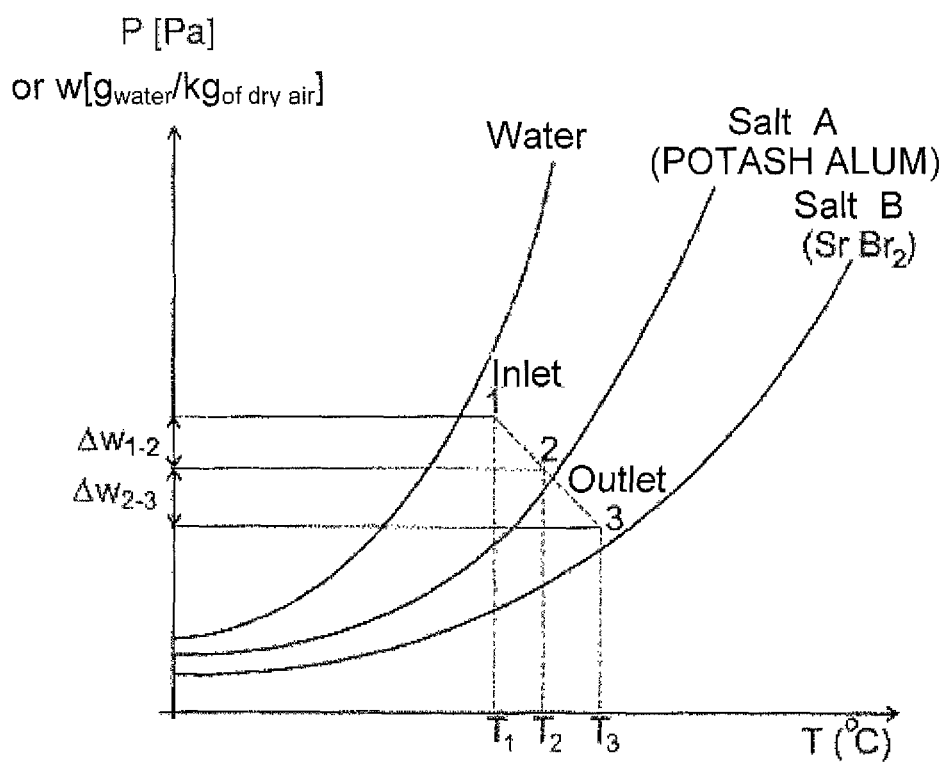

FIG. 2 illustrates this operation: it shows the change in the thermodynamic conditions of the air at points 1, 2 and 3 which correspond respectively to the temperature at the inlet of the layer 10 of the first salt A, at the outlet of the layer 10 of the first salt A, and at the outlet of the layer 20 of the second salt B.

The values Δw represent the water (absolute humidity) losses of the moist air during passage through the salts A then B. Thus, during the respective hydration of salt A then of salt B, the inlet temperature $T_1$ increases to the temperature $T_2$ in order to reach in the end the temperature $T_3$. This temperature increase $T_3-T_1$ therefore corresponds to a heating power that may be used for example for heating a building or producing domestic hot water.

In summertime, for storing thermal energy, a flow of air is circulated that will dehydrate the second salt B then the first salt A. The flow of air may circulate in the opposite direction to that which has just been described for the hydration, that is to say firstly passing through the layer 20 of the salt B then the layer 10 of the salt A. Alternatively, it may circulate in the same direction as that which has just been described for the hydration, that is to say firstly passing through the layer 10 of the salt A then the layer 20 of the salt B.

In order to pass through the two salts A and B in series according to the invention, the two layers 10, 20 may be superposed in one and the same fixed bed reactor. It is also possible to put each of the two layers 10, 20 in a separate reactor of fixed bed type or of circulating fluidized bed type and to connect the two reactors in series. One advantage of using two reactors that are separated from one another is that it is possible to use only one thereof, that is to say to hydrate only the salt having the lowest equilibrium temperature, when the heat recovery requirement is lower.

Figure 3:
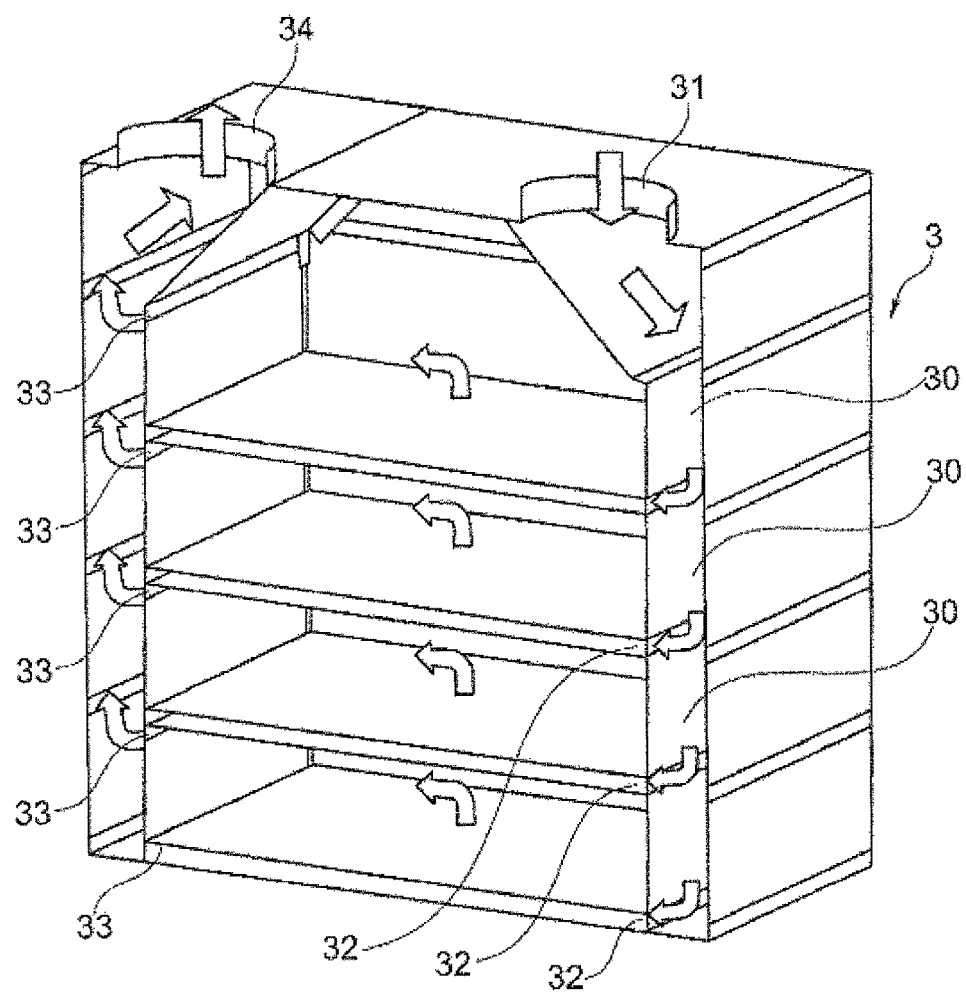
FIG. 3 is a perspective and partial cross-sectional view of an example of a fixed bed reactor according to the invention.

Represented in FIG. 3 is a fixed bed reactor 3 containing several stages 30 suitable for the implementation of the invention. The reactor 3 comprises an inlet opening 31 through which a flow of moist air may circulate and penetrate via the lower slot 32 of each stage 30 and thus circulate in a distributed manner in each stage 30.

The flow of air that has passed through the two layers 10, 20 of the two salts A and B at each stage 30 then leads via the upper slot 33 in order in the end to leave via the outlet opening 34 of the reactor 3.

On each of these stages 30, it is possible to deposit a stack of a layer 10 of the first salt A on a layer 20 of the second salt B. Each of the two layers 10, 20 is preferably of uniform height. The total height of two superposed layers 10, 20 is between, for example, 5 and 10 cm. The respective amounts of each salt A, B are calculated as a function of the following parameters: reaction kinetics of the materials, energy densities of the reactants, amount of energy that it is desired to extract from each of the reactants, pressure drops of the total layer, temperature and moisture conditions at the inlet, desired temperature conditions at the outlet, and technical and economic optimization.

Figure 4A:
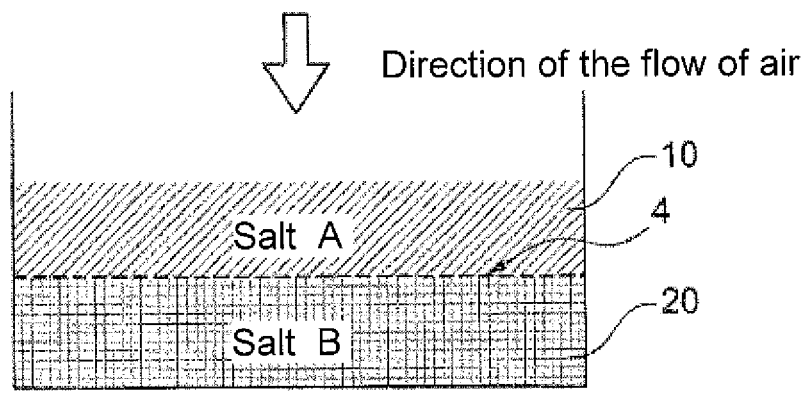
FIGS. 4A and 4B illustrate, in schematic cross-sectional view, a stack of two layers of different salts, inserted between which is an open separating structure according to one example of the invention.
Figure 4B:
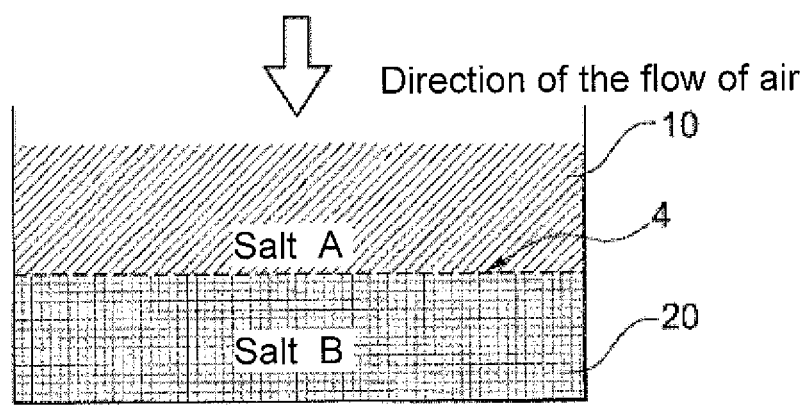

Between a layer 10 of a first salt A and layer 20 of a second salt B, it is possible to insert a preferably metallic, separating fabric 4. The diameter of the yarn or yarns of the fabric and also the mesh openings of the fabric are suitable both for easily allowing air to pass through and for preventing the mixing of the two salts A and B with one another. The metallic fabric 4 is not held mechanically in the reactor in order to allow the swelling and deswelling of each salt undergoing reaction independently. Represented in FIGS. 4A and 4B are the respectively dehydrated and hydrated configurations of the layers 10 of the salt A and of the salt B. Thus, the hydration of the salts A and B makes them swell freely without there being any mechanical stresses generated on the separating fabric or screen 4.

By way of example, a metallic fabric having an individual yarn diameter equal to 0.040 mm, with a nominal mesh opening equal to 0.071 mm, is perfectly suitable for separating a layer of potash alum from a layer of strontium bromide.

Although described in connection with a flow of moist air, the invention may just as well be carried out with a flow of a mixture of a gas having the role of heat transfer fluid and of a gas having the role of reactant with the salts A, B.

Similarly, although the invention has been described with two salts A, B having different equilibrium curves being placed in series, the invention may just as well be carried out by placing a higher number of salts, for example three different salts, in series.

The invention is not limited to the examples which have just been described; it is possible in particular to combine together features of the examples illustrated within variants that are not illustrated.

REFERENCES CITED

[1]: "*Solar heating and cooling by a thermochemical process. First experiments of a prototype storing 60 kWh by a solid/gas reaction*" by Mauran, S., Lahmidi, H., Goetz, V., *Solar Energy*, Vol. 82, Issue 7, July 2008, pages 623-636;

[2]: "*Evaluation par analyse thermique différentielle des chaleurs de déshydratation de plusieurs aluns de chrome, aluminium et fer*"[Differential thermal analysis evaluation of the heats of dehydration of several alums of chromium, aluminum and iron], by Mireille HARMELIN, Journal of Thermal Analysis, Vol. 1 (1969), pages 137-150.

The invention claimed is:

1. A process for storing thermal energy by chemical reaction wherein a flow of heat transfer gas is circulated through a layer of a first hygroscopic salt A then through a layer of a second hygroscopic salt B, the gas being reactive with the salts A and B, the thermodynamic equilibrium curve of the salt A being located further to the left than that of the second salt B in a pressure-temperature phase diagram, the circulation of the flow of gas giving rise to a dehydration or hydration reaction both of the first salt A and of the second salt B; wherein the first salt A is selected from the double sulfate of aluminum and potassium (KAl(SO4)2), strontium hydroxide Sr(OH)2, sodium sulfide Na2S and ammonium aluminum sulfate NH4Al(SO4)2, while the second salt B is respectively selected from strontium bromide (SrBr2), sodium sulfide (Na2S), and nickel sulfate (NiSO4).

2. The process for storing or releasing thermal energy as claimed in claim 1, wherein the flow of gas is a flow of moist air.

3. The process for storing and releasing thermal energy as claimed in claim 1 wherein the circulation of the flow of moist air that gives rise to the dehydration reaction takes place, through the salts, in the same direction as that which gives rise to the hydration reaction.

4. The process for storing and releasing thermal energy as claimed in claim 1, wherein the circulation of the flow of moist air that gives rise to the dehydration reaction takes place, through the salts, in the opposite direction to that which gives rise to the hydration reaction.

5. An application of the process as claimed in claim 1 to an interseasonal storage of solar heat.

* * * * *